US009770689B2

(12) United States Patent
Peng et al.

(10) Patent No.: US 9,770,689 B2
(45) Date of Patent: Sep. 26, 2017

(54) METHOD FOR PROCESSING ACID GAS AND APPARATUS THEREOF

(71) Applicants: CHINA PETROLEUM & CHEMICAL CORPORATION, Beijing (CN); Fushun Research Institute of Petroleum and Petrochemicals, SINOPEC CORP., Fushun, Liaoning (CN)

(72) Inventors: Deqiang Peng, Liaoning (CN); Zejun Zuo, Liaoning (CN); Huimin Qi, Liaoning (CN); Luyao Wang, Liaoning (CN); Fanfei Meng, Liaoning (CN); Jianbing Chen, Liaoning (CN); Xin Chen, Liaoning (CN)

(73) Assignees: CHINA PETROLEUM & CHEMICAL CORPORATION, Beijing (CN); FUSHUN RESEARCH INSTITUTE OF PETROLEUM AND PETROCHEMICALS, SINOPEC CORP., Fushun, Liaoning (CN)

( * ) Notice: Subject to any disclaimer, the term of this patent is extended or adjusted under 35 U.S.C. 154(b) by 138 days.

(21) Appl. No.: 14/528,940

(22) Filed: Oct. 30, 2014

(65) Prior Publication Data
US 2015/0224442 A1 Aug. 13, 2015

(30) Foreign Application Priority Data

Feb. 10, 2014 (CN) .......................... 2014 1 0046348

(51) Int. Cl.
B01D 53/52 (2006.01)
B01D 53/86 (2006.01)
(Continued)

(52) U.S. Cl.
CPC ........... *B01D 53/526* (2013.01); *B01D 53/75* (2013.01); *B01D 53/77* (2013.01);
(Continued)

(58) Field of Classification Search
CPC .......... B01D 2251/304; B01D 2251/60; B01D 2251/604; B01D 2257/504; B01D 53/526;
(Continued)

(56) References Cited

U.S. PATENT DOCUMENTS

2003/0056648 A1* 3/2003 Fornai .................... B01D 47/06
95/65
2009/0101012 A1* 4/2009 Gal ..................... B01D 53/1406
95/225

(Continued)

*Primary Examiner* — Duane Smith
*Assistant Examiner* — Cabrena Holecek
(74) *Attorney, Agent, or Firm* — Novick, Kim & Lee, PLLC; Allen Xue

(57) ABSTRACT

The present disclosure provides a method for processing an acid gas, comprising: using a processor 1 for receiving and processing the acid gas to obtain a gas phase stream 1 and a liquid phase stream 2, wherein the stream 2 is partially or completely recycled to the processor 1; using a processor 2 for processing the stream 1 from the processor 1 to obtain a gas phase stream 3 and a liquid phase stream 4; using a processor 3 for processing the stream 3 from the processor 2 to obtain a gas phase stream 5 and a liquid phase stream 6; and using a processor 4 for receiving the stream 43 from the processor 2 and using the stream 43 as a processing solution for processing the stream 5 from the processor 3 to obtain a gas phase stream 7 and a liquid phase stream 8, which can be divided into two sub-streams including a stream 81 and a stream 82. The present disclosure further provides an apparatus for processing an acid gas.

6 Claims, 5 Drawing Sheets

(51) Int. Cl.
*B01D 53/75* (2006.01)
*B01D 53/77* (2006.01)

(52) U.S. Cl.
CPC .... *B01D 2251/304* (2013.01); *B01D 2251/60* (2013.01); *B01D 2251/604* (2013.01); *B01D 2257/504* (2013.01)

(58) Field of Classification Search
CPC ........ B01D 53/75; B01D 53/77; B01D 53/14; B01D 53/1406; B01D 53/1418; B01D 53/1456; B01D 53/1462; B01D 53/1468; B01D 53/1475; B01D 53/1481; B01D 53/18; B01D 53/185
See application file for complete search history.

(56) References Cited

U.S. PATENT DOCUMENTS

| | | | | |
|---|---|---|---|---|
| 2009/0151318 | A1* | 6/2009 | Handagama | B01D 53/1425 60/39.182 |
| 2012/0063975 | A1* | 3/2012 | Koss | B01D 53/1425 423/220 |
| 2013/0266997 | A1* | 10/2013 | Hickey | C12P 7/16 435/140 |

* cited by examiner

METHOD FOR PROCESSING ACID GAS AND APPARATUS THEREOF

FIELD OF THE INVENTION

The present disclosure provides a method for processing an acid gas and an apparatus thereof, which relate to the field of acid gas purification. The present disclosure particularly relates to a method for purifying and recycling acid gases which contain hydrosulfides and an apparatus thereof.

BACKGROUND OF THE INVENTION

Acid gases in refineries, substantially comprising $H_2S$ and $CO_2$, mainly come from acid water strippers, recycled hydrogen desulfurization apparatuses, dry gas desulfurization apparatuses, and the like. Currently, acid gases in most small refineries are basically discharged after being combusted. This method, on the one hand, is a waste of resources, and on the other hand, brings about tremendous pressure to environmental protection and affects business development. In order to protect the environment and ensure sufficient utilization of resources, acid gas recycling in small refineries is rather imperative.

In medium and large-sized refineries, acid gasses are mainly used for preparing sulfur, currently, through two processes, i.e. one involves the secondary Claus, exhaust hydrogenation, plus solvent absorption process, while the other adopts the LO-CAT process developed by Merichem Company which focuses on gas technology products.

The secondary Claus, exhaust hydrogenation, plus solvent absorption process is featured by process maturity, stable operation, and stable product quality of sulfur. However, due to long process procedures and large investment, the Claus process can only be used for treatment of high concentrated acid gasses. Operation difficulties might arise when the volume fraction of $H_2S$ in the gases is lower than 20%. As a result, the Claus process is suitable for equipment having an annual output of sulfur more than 5,000 t.

The LO-CAT process uses a multi-chelated iron catalyst to directly convert $H_2S$ into the element of sulfur, with a removal rate of $H_2S$ over 99.9%. The LO-CAT process can be adapted to various operating conditions, such as high amount fluctuations of acid gasses and concentration fluctuations of $H_2S$ in the range from 0% to 100%. Hence, the LO-CAT process can be practically used to process various sources in different conditions. Besides, the LO-CAT liquid redox process does not use any toxic chemicals, nor will it produce any harmful by-products. Moreover, environmentally safe catalysts can be continuously regenerated in the process. However, the LO-CAT process is subject to high operation costs, inferior purity and color of sulfur to those achievable in the Claus process, and occurrence of blockage due to sulfur particles generated in the production process. Therefore, the LO-CAT process is accompanied with lower economy efficiency in equipment with an annual sulfur production below 5,000 t (than the secondary Claus, exhaust hydrogenation, plus solvent absorption process can achieve).

Since small refineries produce relatively small amounts of acid gasses, using the secondary Claus, exhaust hydrogenation, plus solvent absorption process therein results in the problems of long process procedures, complicated operations, large investments, and poor scale benefits. And use of the LO-CAT process in small refineries also leads to the problems of large one-time investments, high costs of catalysts and patent licensing fees, and the like. Therefore, small refineries which produce small amounts of acid gases can employ a new desulfurization process which requires smaller investments to recover $H_2S$ and prepare sulfites. In the new process, acid gasses are first burned to generate $SO_2$, which is then fed into an adsorption column for chemical absorption to generate a sulfate solution. The solution is subsequently reacted with an alkaline absorbent to produce liquid or crystal products of sulfites, form which solid sulfite products can be prepared through separation, drying, and other procedures. The new process is characterized by short procedures, simple reactions, and flexible operations, and can be adapted to the influences imposed upon the production process by fluctuations of acid gasses in small refineries. The solid or liquid products can be produced by selecting different procedures, and different absorbers can produce different types of sulfites. Exhaust emission standards are achievable through three-stage absorption, so as to achieve the purpose of purifying exhaust gasses. In actual production processes, however, there exists problems of serious equipment corrosion and high maintenance costs.

CN 101143714A discloses a method for preparing sulfuric acid by an acid gas with a high concentration of hydrocarbons. The acid gas hydrogen sulfide enters a first hydrogen sulfide burning furnace and a second hydrogen sulfide burning furnace respectively in proportion for combustion. High temperature furnace gas coming out from the first burning furnace is first cooled down to a certain temperature by air through a furnace gas cooler, and then enters the second burning furnace to burn with a supplementary acid gas containing hydrogen sulfide and residual air in the furnace gas. High temperature furnace gas coming out from the second burning furnace enters a waste heat boiler for heat accumulation, and then enters a purification section, a conversion section, and a dry absorption section for conventional acid production. This method is only capable of producing 98% of industrial sulfuric acid but fails to produce fuming sulfuric acid which is of higher values. Meanwhile, difficulties in transportation and storage of the sulfuric acid render stable market requirements in nearby refineries critical to the development thereof.

CN 1836767A discloses a method for treating acid gases from oil refineries. The acid gases are used as a fuel in the vertical kilns of a cement plant. During the combustion of the acid gases in the kiln, the component of $H_2S$ thereof is reacted with cement materials to produce $CaSO_4$, while other harmful components are sintered and converted as well. This method fundamentally solves the problem of acid gas treatment while providing fuels to cement plants, reaching dual purpose of protecting environment and providing fuels. However, this method is also somewhat limited and difficult to be promoted.

CN 101337661A discloses a method for preparing sodium hydrosulfide. Caustic soda and lime cream are used to absorb an acid gas containing $H_2S$ and $CO_2$ to generate intermediate solutions respectively, and then the above two intermediate solutions are mixed at a certain ratio to obtain a sodium hydrosulfide product having a low content of carbonate ions. This method does not require a high concentration of $H_2S$ in the acid gas, but the procedures thereof are rather long and are of a low degree of automation.

In "Industrial technology of preparing sodium sulfide from absorption of hydrogen sulfide with sodium hydroxide solution" (Shang Fangyu, *Inorganic Chemicals Industry*, vol. 44(2), February 2012), it discloses a process of absorbing hydrogen sulfide by a sodium hydroxide solution to prepare sodium sulfide, wherein a sodium hydroxide solution at a concentration in the range from 380 g/L to 420 g/L is used for absorbing hydrogen sulfide in a packed column. The mass concentration of sodium sulfide at the end of the reaction is controlled within the range from 330 g/L to 350 g/L, with an absorption rate of hydrogen sulfide in the range from 95% to 98%. This process does not only provide effective way of environment protection, but also produce benefits for companies. However, the sodium sulfide in the process is easily subject to deterioration and difficult to be stored.

Based on the foregoing, small fineries are now in urgent need of a comprehensively good (safe, environmentally friendly, economic, etc.) process for processing acid gasses.

SUMMARY OF THE INVENTION

To solve the problems in the prior art, the present disclosure provides a method for processing an acid gas and an apparatus thereof. Compared to the prior art, the method and apparatus of the present disclosure for processing an acid gas enable the acid gas to be discharged at a required standard and produce desirable NaHS products, thus achieving dual goals of acid gas purification and reutilization of exhaust gasses.

A first embodiment of present disclosure relates to a method for processing an acid gas, comprising:

using a first processor for receiving and processing the acid gas to obtain a gas phase stream 1 and a liquid phase stream 2, wherein the stream 2 is partially or completely recycled to the first processor, using a second processor for processing the stream 1 from the first processor to obtain a gas phase stream 3 and a liquid phase stream 4, which is divided into three sub-streams including a stream 41, a stream 42, and a stream 43, wherein the stream 41 is returned to the first processor as a processing solution used for processing the acid gas, and the stream 42 is recycled to the second processor, using a third processor for processing the stream 3 from the second processor to obtain a gas phase stream 5 and a liquid phase stream 6, which is divided into two sub-streams including a stream 61 and a stream 62, wherein the stream 61 is returned to the second processor as a processing solution used for processing the stream 1, and the stream 62 is recycled to the third processor, and using a fourth processor for receiving the stream 43 from the second processor and using the stream 43 as a processing solution for processing the stream 5 from the third processor to obtain a gas phase stream 7 and a liquid phase stream 8, which can be divided into two sub-streams including a stream 81 and a stream 82, wherein the stream 81 is returned to the third processor as a processing solution, and the stream 82 is recycled to the fourth processor.

In one preferred embodiment of the method of the present disclosure, the acid gas comprises hydrogen sulfide and carbon dioxide.

According to another preferred embodiment of the method of the present disclosure, a treatment agent is added in the second processor and the third processor for processing acid gasses in the second processor and the third processor, respectively.

Specifically, in a further preferred embodiment of the method of the present disclosure, the stream 61 obtained in the third processor is mixed with the treatment agent and then fed into the second processor to be used as a processing solution.

In another preferred embodiment of the method of the present disclosure, the stream 81 obtained in the fourth processor is mixed with the treatment agent, and then fed into the third processor to be used as a processing solution.

In another preferred embodiment of the method of the present disclosure, the third processor can comprise one or more reactors. That is, the acid gas in the third processor can be processed in multi-stages.

In another preferred embodiment of the method of the present disclosure, the treatment agent is a solution comprises an alkali, preferably at least one selected from a group consisting of a sodium hydroxide solution, a potassium hydroxide solution, and an aqueous ammonia solution, and more preferably a sodium hydroxide solution. Specifically, the acid gas adsorption process of the present disclosure mainly uses a NaOH solution as an adsorption solution to process the acid gas and produce NaHS.

In some preferred embodiments of the present disclosure, the first processor is controlled as discharging a NaHS solution, which, after being analyzed and tested to be qualified, is continuously pumped out of the apparatus via a product pump.

In some preferred embodiments of the present disclosure, the acid gas comprises hydrogen sulfide and can be acid gasses of various sources containing $H_2S$, wherein the volume fraction of $CO_2$ in the acid gas is less than 7%, preferably less than 5%. The mass concentration of the NaOH solution is in the range from 20% to 60%, preferably 32% to 38%.

In the present disclosure, the amount of the NaOH solution used is a fixed design value determined by the contents of $H_2S$ and $CO_2$ in the acid gas. Based on the amount of the acid gas, the required amount of the NaOH solution is calculated in such a way as to enable complete reaction of $H_2S$ and $CO_2$ in the acid gas. The design value of the NaOH solution is 80% to 99%, preferably 85% to 95% of the required amount thereof.

In the method of the present disclosure, the adding amount of the NaOH solution can be adjusted according to the content of $H_2S$ in the acid gas after being treated in the fourth processor via a control valve, so as to ensure a content of $H_2S$ in the range from 5 $mg/Nm^3$ to 30 $mg/Nm^3$ (within the range of the emission standard) in the acid gas after being treated in the fourth processor without excessive use of the NaOH solution.

In one preferred embodiment of the method of the present disclosure, the first processor, the second processor, the third processor, and the fourth processor are each independently selected from a group consisting of a bubble column reactor, a packed column reactor, an impinging stream reactor, a rotating bed reactor, and a Venturi reactor. In a further preferred embodiment, the first processor and the second processor are respectively Venturi reactors, and the third processor and the fourth processor are respectively rotating bed reactors. In a further preferred embodiment, the rotating speed of the rotating bed reactor is controlled within the range from 50 rpm to 5,000 rpm, preferably 150 rpm to 2,000 rpm.

In one preferred embodiment of the method of the present disclosure, the treatment temperature in the first processor and second processor is in the range from 70° C. to 100° C., preferably 80° C. to 95° C.

In one preferred embodiment of the method of the present disclosure, the treatment temperature in the third processor and the fourth processor is in the range from 60° C. to 90° C., preferably 65° C. to 80° C.

In a further preferred embodiment, the Venturi reactor comprises: an upper liquid storage tank for receiving and storing liquid streams, a middle straight reaction tube, a feed section of which has an upper portion extending into the liquid storage tank to form a sleeve structure, and a lower gas-liquid separation tube which is connected to the straight reaction tube via a lower portion of a discharge section of the straight reaction tube. The liquid storage tank is provided with a gas phase inlet for receiving a gas to be treated, the gas phase inlet being located above an upper inlet of the feed section of the straight reaction tube. And the liquid storage tank is provided with a circulating fluid inlet on a sidewall thereof for receiving recycled liquid, so that a liquid stream entering the circulating fluid inlet is first stored in the liquid storage tank at a space below the upper inlet of the feed section of the straight reaction tube, and will overflow when the liquid is level with the upper end of the feed section, thus forming a liquid film on an inner wall of the straight reaction tube, so as to prevent formation of crystals of a material on the inner wall thereof, which would otherwise cause blockage. For example, the acid gas enters the straight reaction tube through the gas phase inlet can react with the processing solution to generate crystals which can be absorbed on the wall of straight reaction tube.

Further preferably, the straight reaction tube of the Venturi reactor is provided with a liquid stream inlet on a tube wall thereof for receiving a liquid stream as a processing solution, wherein the liquid stream inlet is located at a position adjacent to a connecting portion of the liquid storage tank and the straight reaction tube, and the gas-liquid separation tube is provided with a gas phase outlet and a liquid phase outlet.

In a further preferred embodiment of the Venturi reactor of the present disclosure, the feed section of the Venturi reactor has a tooth-shaped upper end, which is one selected from a group consisting of sector tooth-shaped, square tooth-shaped, and triangular tooth-shaped upper ends, preferably a triangular tooth-shaped upper end.

In a further preferred embodiment of the Venturi reactor of the present disclosure, the liquid stream inlet of the Venturi reactor is connected to a liquid phase distributor, which is provided at the center line of the straight reaction tube and can inject an absorption liquid downwardly, wherein 1 to 10, preferably 4 to 6 liquid phase distributors can be arranged.

In some preferred embodiments of the present disclosure, the flow ratio of the volume of a portion of the stream 2 that is returned to the first processor to the total volume of the stream 2 is in the range from 1:3 to 9:10, preferably 5:6 to 8:9.

In some further preferred embodiments of the present disclosure, the Venturi reactor as shown in FIG. 3 is used as the first processor, and the stream 2 that is recycled to the first processor completely or partially enters the first processor (the Venturi reactor) via the circulating fluid inlet and an absorption fluid inlet thereof, respectively, wherein the volume flow ratio of the stream that enters the first processor via the circulating fluid inlet to the stream that enters the first processor via the absorption fluid inlet is in the range from 1:6 to 1:2, preferably 1:4 to 1:3.

In some preferred embodiments of the present disclosure, the flow ratio of the volume of the stream 42 that is returned to the second processor to the volume of the stream 4 is in the range from 1:3 to 9:10, preferably 5:6 to 8:9.

In some further preferred embodiments of the present disclosure, the Venturi reactor as shown in FIG. 3 is used as the second processor, and the stream 42 that is recycled to the second processor enters the second processor (Venturi reactor) via the circulating fluid inlet and an absorbed fluid inlet thereof, respectively, wherein the volume flow ratio of the stream that enters the second processor via the circulating fluid inlet to the stream that enters the second processor via the absorbed fluid inlet is in the range from 1:6 to 1:2, preferably 1:4 to 1:3.

In some preferred embodiments of the present disclosure, the volume flow ratio of the stream 43 that enters the fourth processor as an absorbed liquid to the stream 4 is in the range from 1:4 to 1:2, preferably 1:3 to 2:5.

In some preferred embodiments of the present disclosure, the volume flow ratio of the stream 62 that is returned to the third processor to the stream 6 is in the range from 1:3 to 9:10, preferably 5:6 to 8:9.

In some preferred embodiments of the present disclosure, the volume flow ratio of the stream 82 that is returned to the fourth processor to the stream 8 is in the range from 1:3 to 9:10, preferably 5:6 to 8:9. In some preferred embodiments of the present disclosure, the volume flow ratio of the treatment agent (preferably a NaOH solution) added in the second processor to that added in the third processor is in the range from 1:1 to 3:1, preferably 3:2 to 5:2.

In the process of the present disclosure, the acid gas after being treated in the fourth processor is further demist via a coalescer before being discharged.

According to a second embodiment of the present disclosure, it relates to an apparatus for processing an acid gas, comprising:

a first processor for receiving and processing the acid gas to obtain a gas phase stream 1 and a liquid phase stream 2, wherein the stream 2 is partially or completely recycled to the first processor, a second processor connected to the first processor, the second processor being used for processing the stream 1 from the first processor to obtain a gas phase stream 3 and a liquid phase stream 4, which is divided into three sub-streams including a stream 41, a stream 42, and a stream 43, wherein the stream 41 is returned to the first processor as a processing solution used for processing the acid gas, and the stream 42 is recycled to the second processor, a third processor connected to the second processor, the third processor being used for processing the stream 3 from the second processor to obtain a gas phase stream 5 and a liquid phase stream 6, which is divided into two sub-streams including a stream 61 and a stream 62, wherein the stream 61 is returned to the second processor as a processing solution used for processing the stream 1, and the stream 62 is recycled to the third processor, and a fourth processor respectively connected to the second processor and the third processor, the fourth processor being used for receiving the stream 43 from the second processor and processing the stream 5 from the third processor with the stream 43 as a processing solution to obtain a gas phase stream 7 and a liquid phase stream 8, which can be divided into two sub-streams including a stream 81 and a stream 82, wherein the stream 81 is returned to the third processor as a processing solution, and the stream 82 is recycled to the fourth processor.

In one preferred embodiment of the apparatus of the present disclosure, the first processor, the second processor, the third processor, and the fourth processor are each independently selected from a group consisting of a bubble column reactor, a packed column reactor, an impinging stream reactor, a rotating bed reactor, and a Venturi reactor.

In one preferred embodiment of the apparatus of the present disclosure, the first processor and the second processor are respectively Venturi reactors, and the third processor and the fourth processor are respectively rotating bed reactors. In a further preferred embodiment, the rotating speed of the rotating bed reactor is controlled within the range from 50 rpm to 5,000 rpm, preferably 150 rpm to 2,000 rpm.

In one preferred embodiment of the apparatus of the present disclosure, the Venturi reactor comprises: an upper liquid storage tank for receiving and storing liquid streams, a middle straight reaction tube, a feed section of which has an upper portion extending into the liquid storage tank to form a sleeve structure, and a lower gas-liquid separation tube which is connected to the straight reaction tube via a lower portion of a discharge section of the straight reaction tube. The liquid storage tank is provided with a gas phase inlet for receiving a gas to be treated, the gas phase inlet being located above an upper inlet of the feed section of the straight reaction tube. And the liquid storage tank is provided with a circulating fluid inlet on a sidewall thereof for receiving recycled liquid, the circulating fluid inlet being located below the upper inlet of the feed section of the straight reaction tube, so that a liquid stream entering the circulating fluid inlet is first stored in the liquid storage tank at a space below the upper inlet of the feed section of the straight reaction tube, and will overflow when the liquid is level with the upper end of the feed section, thus forming a liquid film on an inner wall of the straight reaction tube, so as to prevent formation of crystals of a material on the inner wall thereof, which would otherwise cause blockage. For example, the acid gas enters the straight reaction tube through the gas phase inlet can react with the processing solution to generate crystals which can be stuck on the wall of straight reaction tube.

In a further preferred embodiment, the straight reaction tube of the Venturi reactor is provided with a liquid stream inlet on a tube wall thereof for receiving a liquid stream as a processing solution, wherein the liquid stream inlet is located at a position adjacent to a connecting portion of the liquid storage tank and the straight reaction tube.

In a further preferred embodiment of the Venturi reactor of the present disclosure, the feed section of the Venturi reactor has a tooth-shaped upper end, which is one selected from a group consisting of sector tooth-shaped, square tooth-shaped, and triangular tooth-shaped upper ends, preferably a triangular tooth-shaped upper end.

In a further preferred embodiment of the Venturi reactor of the present disclosure, the liquid stream inlet of the Venturi reactor is connected to a liquid phase distributor, which is provided at the center line of the straight reaction tube and can inject absorbed liquid downwardly, wherein 1 to 10, preferably 4 to 6 liquid phase distributors can be arranged.

In the apparatus for processing an acid gas of the present disclosure, a coalescer is provided between the gas phase outlet of the fourth processor and an outlet pipeline thereof. The coalescer is in the form of a cylindrical barrel, which is provided with an upper head, a lower head, and a cylindrical screen therein. The coalescer is used for further treating the acid gas that has been treated by the fourth processor to obtain a final purified gas.

In the apparatus for processing an acid gas of the present disclosure, the gas-liquid separation tube of the Venturi reactor is provided with a temperature control device for controlling the temperature therein within the range from 85° C. to 120° C., preferably 90° C. to 95° C., so as to prevent formation of crystals of any intermediate product.

Compared to the prior art, the method and apparatus for processing an acid gas of the present disclosure have the following advantages.

To start with, the method of processing an acid gas of the present disclosure employs a process of four-stage gas-liquid two-phase countercurrent absorption reaction, wherein self-circulation and re-absorption procedures of a stream are provided, thus improving reaction and enabling sufficient contact between the stream and the acid gas. As a result, the liquid phase product NaHS is ensured of the national quality standard, with a content of $Na_2S$ therein less than 4%. The circulation of the stream enables the alkali solution to adequately contact the acid gas, resulting in a content of $H_2S$ less than 30 mg/$Nm^3$ in the purified gas, and ensuring the achievement of the goal that the exhaust gas after being performed acid gas treatment can reach the emission standards.

Next, in the method for processing an acid gas of the present disclosure, adjustment of the reaction intensity in different stages by adding the NaOH solution in the stages (second processor and the third processor) respectively, and peak load shifting treatment to reaction heat ensure that the temperatures in different stages of processors are controlled within proper ranges. Hence, formation of hot spots can be prevented, which would otherwise cause partial crystallization and therefore termination of the reaction.

Besides, in the method for processing an acid gas of the present disclosure, in processing the gas containing $CO_2$ and $H_2S$, circulation of the stream obtained in the second processor rich in $Na_2CO_3$ into the fourth processor as an absorbed liquid realizes the purpose of absorbing $H_2S$ for replacement of $CO_2$. Hence, the content of $CO_2$ in the acid gas is reduced, thus reducing the contents of $Na_2CO_3$ and $NaHCO_3$ formed in liquid products. Therefore, precipitation of crystals can be prevented, thus ensuring a long-term operation of the apparatus.

Moreover, when the Venturi reactor of the present disclosure is used as the first processor or second processor, the stream enters the liquid storage tank of the reactor through the circulating fluid inlet of the Venturi reactor. When the elevation of the circulating fluid is above the inlet of the feed section, the circulating stream overflows and is distributed over the entire wall of the reactor in the form of a wall flow. Thus, a homogeneous liquid film is formed on the inner wall of the reactor and acts as a separator, which does not only prevent precipitation of any crystal to be adhered to the inner wall of the reactor, but also forms a heat adsorption medium to absorb the heat of reaction, thus effectively preventing excessive evaporation of the stream.

Furthermore, the apparatus for processing an acid gas of the present disclosure uses a rotating packed bed as a gas-liquid reactor, which can improve mass transfer and reaction efficiency. As an efficient mass transfer device, the rotating bed reactor ensures rapid reaction, fewer side reactions, and lower content of impurities in the products. Meanwhile, since the mass transfer efficiency of a rotating bed reactor is hundreds of times that of an ordinary tower reactor, the scale of the reactor can be significantly reduced. Nano-crystals of $Na_2CO_3$ are formed in reaction between $CO_2$ and NaOH in the acid gas, so as to prevent clogged pipes by $Na_2CO_3$ crystals in transportation of the fluid. The stream in the high-speed rotating bed impacts on an inner wall of the rotating bed violently to achieve enhanced mixing of the stream. When flowing through the bed, the stream is continuously cut by the bed into droplets, liquid thread, or liquid film, greatly achieving surface renewal and mixing of the high viscosity stream, eliminating the differential concentration thereof, and forming nano-crystals of $Na_2CO_3$.

In addition, the method and apparatus of the present disclosure are particularly suitable for processing acid gasses in small refineries. Compared to the prior art, the apparatus of the present disclosure is of a small scale, low energy consumption, and low operating costs in producing NaHS products that can be easily transported for use in the industries of printing and dyeing, papermaking, etc. Therefore, the method and apparatus of the present disclosure have certain market values.

BRIEF DESCRIPTION OF THE DRAWINGS

In the drawings, the same reference numbers are used for the same devices respectively.

DETAILED DESCRIPTION OF THE EMBODIMENTS

Figure 1:
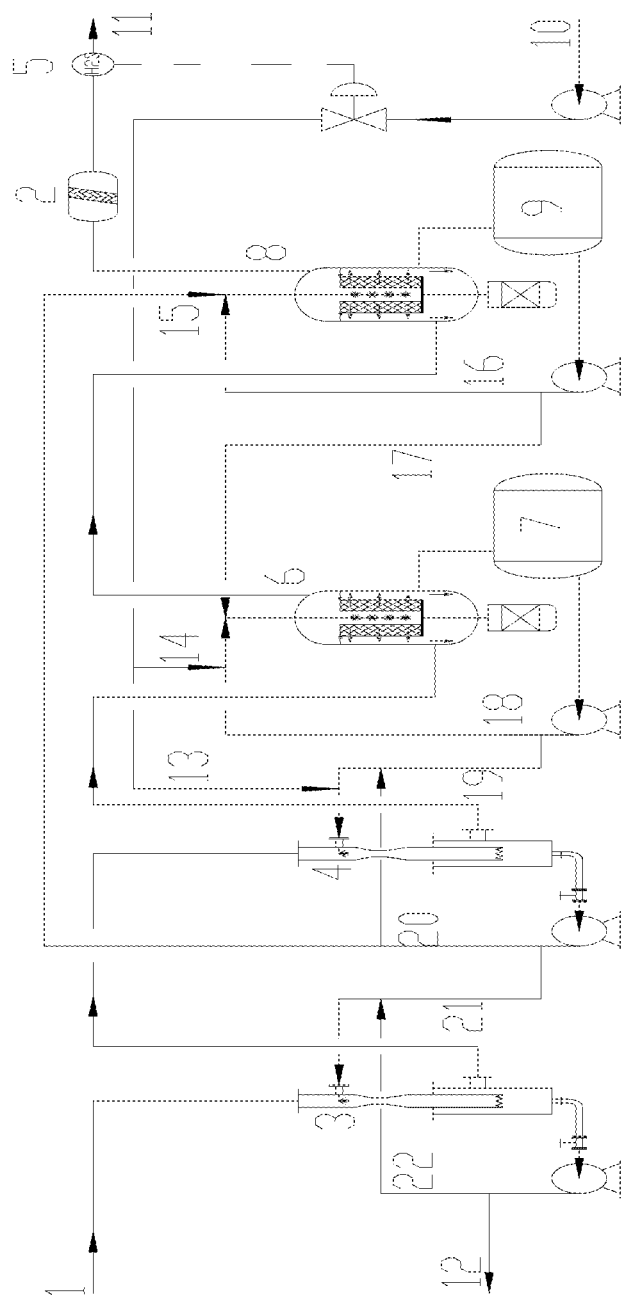
FIG. 1 is a schematic drawing of a method and apparatus for processing an acid gas of the present disclosure.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, group of elements, components, and/or groups thereof.

Language such as "including", "comprising", "having", "containing", or "involving", and variations thereof, is intended to be broad and encompass the subject matter listed thereafter, as well as equivalents, and additional subject matter not recited. Further, whenever a composition, a group of elements, process or method steps, or any other expression is preceded by the transitional phrase "comprising", "including", or "containing", it is understood that it is also contemplated herein the same composition, group of elements, process or method steps or any other expression with transitional phrases "consisting essentially of", "consisting of", or "selected from the group of consisting of", preceding the recitation of the composition, the group of elements, process or method steps or any other expression.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments described herein were chosen and described in order to best explain the principles of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

The following examples are used to explain the present disclosure in more details, but not to restrict the scope of the present disclosure.

The method of the present disclosure is used for processing an acid gas generated in refineries, with a NaOH solution as an absorption solution, to produce NaHS products, wherein a four-stage gas-liquid two-phase countercurrent absorption reaction process is used.

FIG. 1 illustrates a first embodiment of an apparatus for processing an acid gas of the present disclosure, the apparatus comprising a first processor 3, a second processor 4, a third processor 6, a fourth processor 8, a third intermediate tank 7, a fourth intermediate tank 9, and a coalescer 2. The first processor 3, the second processor 4, the third processor 6, and the fourth processor 8 each are arranged with a gas phase inlet, a gas phase outlet, a liquid phase inlet, and a liquid phase outlet, respectively. An acid gas inlet line 1 is connected to the gas phase inlet provided at an upper end of the first processor 3. The gas phase outlet of the first processor 3 is connected to the gas phase inlet of the second processor 4. The gas phase outlet of the second processor 4 is connected to the gas phase inlet of the third processor 6. The gas phase outlet of the third processor 6 is connected to the gas phase inlet of the fourth processor 8. The gas phase outlet of the fourth processor 8 is connected to a purified gas outlet line 11, which is provided with a hydrogen sulfide content detection device 5 thereon. The liquid phase inlets of the second processor 4 and the third processor 6 are respectively connected to an alkali solution inlet line 10 via lines 13 and 14. The liquid phase outlet of the fourth processor 8 is divided into two branches via the fourth intermediate tank 9, with a first branch 17 being connected to the liquid phase inlet of the third processor 6, and a second branch 16 being connected to the liquid phase inlet of the fourth processor 8. The liquid phase outlet of the third processor 6 is divided into two branches via the third intermediate tank 7, with a first branch 18 being connected to the liquid phase inlet of the third processor 6, and a second branch 19 being connected to the liquid phase inlet of the second processor 4. The liquid phase outlet of the second processor 4 is divided into three branches, with a first branch 20 being connected to the liquid phase inlet of the second processor 4, a second branch 21 being connected to the liquid phase inlet of the first processor 3, and a third branch 15 being connected to the liquid phase inlet of the fourth processor 8. The liquid phase outlet of the first processor 3 is divided into two branches, with a first branch 22 being connected to the liquid phase inlet of the first processor 3, and a second branch 12 being connected to a product discharge line.

The method for processing an acid gas of the present disclosure comprises first feeding the acid gas (comprising $H_2S$ and $CO_2$) from an acid gas phase inlet line 1 into a first processor 3, wherein the acid gas contacts and reacts with a generation liquid from a second processor 4, to generate a liquid that is divided into two branches, with a first branch 22 being connected to a liquid phase inlet of the first processor 3, and a second branch 12 being connected to a product discharge line. The acid gas after being treated in the first processor 3 enters the second processor 4 and contacts and reacts with a generation liquid from a third processor 6 and a NaOH solution therein, to generate a liquid that is divided into three branches, with a first branch second generation liquid 21, as an absorption fluid, entering the first processor 3 via a liquid phase inlet thereof, a second branch second generation liquid 20 entering the second processor 4, and a third branch second generation liquid 15, as an absorption fluid, entering a fourth processor 8. The acid gas after being treated in the second processor 4 enters the third processor 6, and reacts with the generation liquid from the fourth processor 8 and a NaOH solution therein, to generate a liquid which enters a third intermediate tank 7 and is then divided into two branches, with a first branch 19 entering the second processor 4 as an absorption fluid via a line, and a second branch 18 being recycled into the third processor 6 via the line. The acid gas after being treated in the third processor 6 enters the fourth processor 8, and reacts with the third branch second generation liquid 15 from the second processor 4. The acid gas after being reacted is further demist via a coalescer 2 and then discharged via a purified gas outlet line 11 with the emission standard being satisfied. A generation liquid then enters a fourth intermediate tank 9 and is divided into two branches, with a first branch 17, as an absorption fluid, entering the third processor 6, and a second branch 16 being recycled to the fourth processor 8 via the line.

Figure 2:
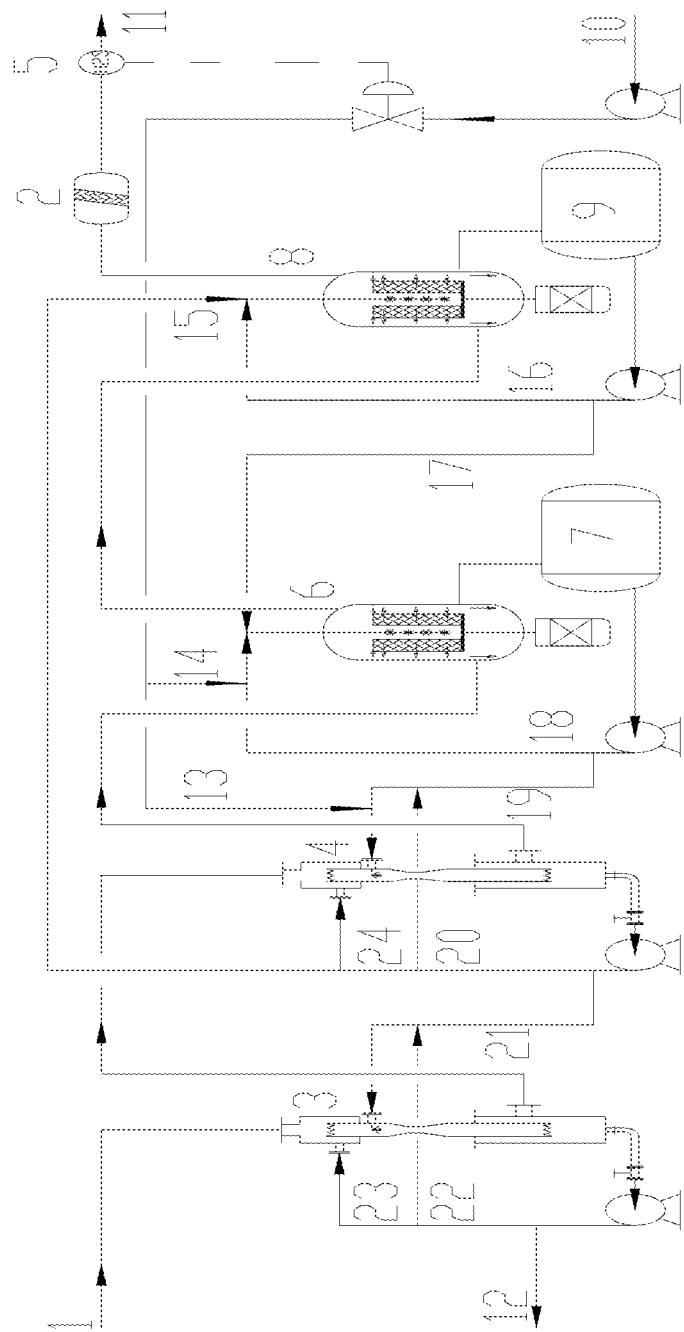
FIG. 2 is a schematic drawing of another method and apparatus for processing an acid gas of the present disclosure.
Figure 3:
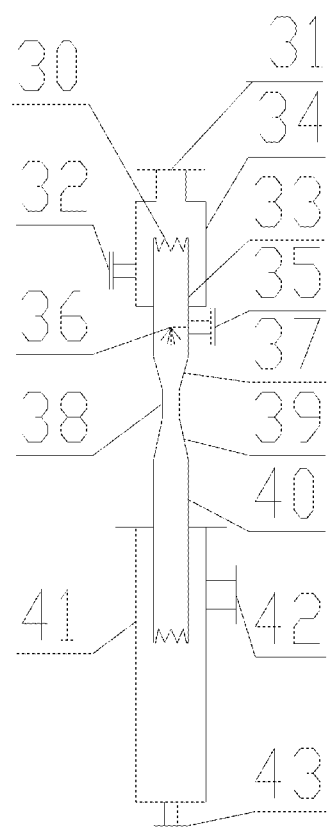
FIG. 3 is a schematic drawing of a Venturi reactor in the method and apparatus for processing an acid gas of the present disclosure.

FIG. 2 shows a second embodiment of the apparatus for processing an acid gas. The apparatus comprises a first processor 3, a second processor 4, a third processor 6, a fourth processor 8, a third intermediate tank 7, a fourth intermediate tank 9, and a coalescer 2, wherein the first processor and the second processor both use Venturi reactors as shown in FIG. 3.

The Venturi reactor comprises three parts: an upper liquid storage tank 34 for receiving and storing liquid streams; a middle straight reaction tube 30 comprising a feed section 33, a contraction section 37, a throat pipe section 38, an expansion section 39, and a discharge section 40, the feed section 33 of the straight reaction tube 30 having an upper portion extending into the liquid storage tank 34 to form a sleeve structure; and a lower gas-liquid separation tube 41 which is connected to the straight reaction tube 30 via a lower portion of the discharge section 40 of the straight reaction tube 30. The liquid storage tank 34 is provided with a gas phase inlet 31, which is located above an upper inlet of the feed section 33. And the liquid storage tank 34 is provided with a circulating fluid inlet 32 on a sidewall thereof. The straight reaction tube 30 is provided with an absorption fluid inlet 35 on a tube wall thereof, wherein the absorption fluid inlet 35 is provided above the throat pipe section 38 and connected to a liquid phase distributor 36. The gas-liquid separation tube 41 is provided with a gas phase outlet 42 and a liquid phase outlet 43.

The third processor 6 and the fourth processor 8 are respectively arranged with a gas phase inlet, a gas phase outlet, an absorption fluid inlet, and a liquid phase outlet. An acid gas inlet line 1 is connected to the gas phase inlet of the first processor 3. The gas phase outlet of the first processor 3 is connected to the gas phase inlet of the second processor 4. The gas phase outlet of the second processor 4 is connected to the gas phase inlet of the third processor 6. The gas phase outlet of the third processor 6 is connected to the gas phase inlet of the fourth processor 8. The gas phase outlet of the fourth processor 8 is connected to a purified gas outlet line 11, which is provided with a hydrogen sulfide content detection device 5. Liquid phase inlets of the second processor 4 and the third processor 6 are respectively connected to an alkali solution inlet line 10 via lines 13 and 14. The liquid phase outlet of the fourth processor 8 is divided into two branches via the fourth intermediate tank 9, with a first branch 17 being connected to the absorption fluid inlet of the third processor 6, and a second branch 16 being connected to the absorption fluid inlet of the fourth processor 8. The liquid phase outlet of the third processor 6 is divided into two branches via the third intermediate tank 7, with a first branch 18 being connected to the absorption fluid inlet of the third processor 6, and a second branch 19 being connected to the liquid phase inlet of the second processor 4. The liquid phase outlet of the second processor 4 is divided into four branches, with a first branch 20 being connected to the absorption fluid inlet of the second processor 4, a second branch 21 being connected to the absorption fluid inlet of the first processor 3, a fourth branch 24 being connected to a circulating fluid inlet of the second processor 4, and a third branch 15 being connected to the absorption fluid inlet of the fourth processor 8. The liquid phase outlet of the first processor 3 is divided into three branches, with a first branch 22 being connected to the absorption fluid inlet of the first processor 3, a second branch 12 being connected to a product discharge line, and a third branch 23 being connected to a circulating fluid inlet of the first processor 3.

The method for processing an acid gas of the present disclosure comprises first feeding the acid gas from an acid gas inlet line 1 into a first processor 3, wherein the acid gas contacts and reacts with a generation liquid from a second processor 4, to generate a liquid that is divided into three branches, with a first branch 22 being connected to a liquid phase inlet of the first processor 3, a second branch being connected to a product discharge line, and a third branch 23 entering a liquid storage tank 34 via a circulating fluid inlet 32 of the Venturi reactor of the first processor. When the elevation of the circulating fluid in the liquid storage tank is above an inlet of a feed section 33, the circulating generation liquid overflows and is distributed over the entire wall of a straight reaction tube 30 of the processor in the form of a wall flow. Thus, a homogeneous liquid film is formed on the inner wall of the straight reaction tube 30 of the processor and acts as a separator, which does not only prevent precipitation of any crystal to be adhered to the inner wall of the straight reaction tube 30 of the processor, but also forms a heat adsorption medium to absorb the heat of reaction, thus effectively preventing excessive evaporation of the generation liquid to form crystals. The acid gas after being treated in the first processor 3 enters a second processor 4 and contacts and reacts with a generation liquid from a third processor 6 and a NaOH solution, to generate a liquid that is divided into four branches, with a first branch generation liquid 21, as an absorption fluid, entering the first processor 3 via a liquid phase inlet thereof, a second branch generation liquid 20 entering the second processor 4, a fourth branch generation liquid 24 entering the second processor 4 via a circulating fluid inlet thereof, and a third branch 15 being connected to an absorption fluid inlet of a fourth processor 8. As is the case in the first processor 3, the circulating fluid overflows in the second processor 4 and is distributed over the entire wall of the straight reaction tube of the second processor 4 in the form of a wall flow. Thus, a homogeneous liquid film is formed on the inner wall of the processor and acts as a separator, which does not only prevent precipitation of any crystal to be adhered to the inner wall of the processor, but also forms a heat adsorption medium to absorb the heat of reaction, thus effectively preventing excessive evaporation of the stream to form crystals. The acid gas after being treated in the second processor 4 enters the third processor 6, and reacts with the generation liquid from the fourth processor 8 and a NaOH solution therein, to generate a liquid which enters a third intermediate tank 7 and then divided into two branches, with a first branch 19 entering the second processor 4 as an absorption fluid via a line, and a second branch 18 being recycled into the third processor 6 via the line. The acid gas after being treated in the third processor 6 enters the fourth processor 8, and reacts with the third branch 15 of the second generation liquid. The acid gas after being reacted is further demist via a coalescer 2 and is discharged via a purified gas outlet line 11 with the emission standard being satisfied. A generation liquid thereof enters a fourth intermediate tank 9 and is divided into two branches, with a first branch 17, as an absorption fluid, entering the third processor 6, and a second branch 16 being recycled to the fourth processor 8 via the line.

The method for processing an acid gas of the present disclosure comprises the following four steps.

(1) Reaction in the First Processor 3

Major reaction in the first processor 3 is as follows. An acid gas that has not been treated is reacted with a second generation liquid (a mixture containing $Na_2S$, $Na_2CO_3$, and $NaHCO_3$). The $Na_2CO_3$, $NaHCO_3$, and $Na_2S$ in the second generation liquid are reacted with excessive amounts of $H_2S$, respectively, to generate a NaHS solution in the first processor, which is divided into two branches, with a first branch being fed into a finished product tank, and a second branch being fed into the first processor 3.

(2) Reaction in the Second Processor 4

Major reaction in the second processor 4 is as follows. The exhaust gas of the first reaction (gas phase of the second reaction) having a reduced concentration of $H_2S$ yet still dissatisfying the emission standard is reacted with a generation liquid of the third processor 6 and a NaOH solution (liquid phase treatment agent of the second-stage reaction). Thereby, the gas phase is purified and a $Na_2S$ solution of a certain concentration is formed. The $Na_2S$ solution is partially conveyed to the first processor 3 for further reaction as an absorption fluid, partially recycled to the second processor 4, and partially entering the fourth processor 8 as an absorption fluid.

(3) Reaction in the Third Processor 6

Major reaction in the third processor 6 is as follows. The exhaust gas of the second reaction (gas phase of the third reaction) having a significantly reduced concentration of $H_2S$ yet still dissatisfying the emission standard is reacted with a generation liquid from the fourth reaction and a NaOH solution (treatment agent of the third reaction). The mixture solution of NaOH and $Na_2S$ is reacted with a slightly excessive amount of $H_2S$ to generate $Na_2S$ and NaHS. The generation liquid obtained in the third processor is divided into two branches, with a first branch entering the second processor 4 as an absorption fluid and a second branch entering the third processor 6 for circulation, so as to achieve deep adsorption and heat circulation of the absorption fluid.

(4) Reaction in the Fourth Processor 8

Major reaction in the fourth processor 8 is as follows. The exhaust gas of the third reaction (gas phase of the fourth reaction) having an extremely low concentration of $H_2S$ that has substantially reached the emission standard is reacted with a generation liquid of the second reaction that is rich in $Na_2CO_3$ (treatment agent of the fourth reaction). $Na_2CO_3$ is reacted with a small amount of $H_2S$ to generate a small amount of $Na_2S$, so as to realize absorption of $H_2S$ to replace $CO_2$. Thus, the amount of $CO_2$ in the acid gas is reduced, so as to reduce amounts of $Na_2CO_3$ and $NaHCO_3$ generated in the liquid phase products. Hence, crystals can be prevented from being precipitated and a long-term operation of the apparatus can be ensured. The generation liquid obtained in the fourth processor is divided into two branches, with a first branch entering the third processor as an absorption fluid, and a second branch entering the fourth processor via the intermediate tank for circulation, so as to achieve deep adsorption and heat circulation of the absorption fluid and ensure satisfaction of the emission standard of the purified gas.

The effects of the present disclosure will be explained in detail in connection with specific examples.

Example 1

An acid gas was reacted with a NaOH solution using the method and apparatus as shown in FIG. 1. The volume fractions of $CO_2$, $H_2S$, and hydrocarbons in the acid gas were respectively 7%, 92%, and 1%. The mass concentration of the NaOH solution was 38%.

In this example, the first processor 3 and the second processor 4 were Venturi reactors, while the third processor 6 and fourth processor 8 were rotating bed reactors.

In this example, the volume flow ratio of the second branch generation liquid 22 that came from the first processor 3 and was recycled to the first processor 3 to the total amount of the generation liquid generated in the first processor was 5:6. The volume flow ratio of the second branch generation liquid 20 that came from the second processor 4 and was recycled to the second processor to the total amount of the generation liquid generated in the second processor was 2:6. The volume flow ratio of the second generation liquid that enters the fourth processor 8 to the total amount of the generation liquid generated in the second processor 4 was 1.5:6. The volume flow ratio of the second branch generation liquid 18 that came from the third processor 6 and was recycled to the third processor 6 to the total amount of the generation liquid generated in the third processor was 5:6. The volume flow ratio of the second branch generation liquid 16 that came from the fourth processor 8 and was recycled to the fourth processor 8 to the total amount of the generation liquid generated in the fourth processor was 5:6.

In this example, the volume flow ratio of the alkali added into the second processor 4 to the alkali added into the third processor 6 was 2:1.

The reaction temperature in the first processor 3 and that in the second processor 4 were respectively 80° C. The reaction temperature in the third processor 6 and that in the fourth processor 8 were respectively 75° C. The rotating speed of the rotating bed in the third processor 6 and that of the rotating bed in the fourth processor 8 were respectively 1,500 rpm. The residence time of the reaction stream in the third processor 6 and that of the reaction stream in the fourth processor 8 were respectively 10 s. The reaction results are as shown in Table 1.

Example 2

The method and apparatus as indicated in FIG. 2 were used. In this example, the first processor 3 and the second processor 4 were Venturi reactors as shown in FIG. 3, while the third processor 6 and fourth processor 8 were rotating bed reactors.

In this example, the volume flow ratio of the generation liquid that came from the first processor 3 and was recycled to the first processor 3 via the absorption fluid inlet thereof to the total amount of the generation liquid generated in the first processor 3 was 5:8. And the volume flow ratio of the generation liquid that came from the first processor 3 and was recycled to the first processor 3 via the circulating fluid inlet 32 thereof to the total amount of the generation liquid generated in the first processor 3 was 5:24.

The volume flow ratio of the generation liquid 21 that came from the second processor 4 and was recycled to the second processor 4 via the absorption fluid inlet thereof to the total amount of the generation liquid generated in the second processor 4 was 5:8. The volume flow ratio of the generation liquid 24 that came from the second processor 4 and was recycled to the second processor 4 via the circulating fluid inlet thereof to the total amount of the generation liquid generated in the second processor 4 was 5:24. And the volume flow ratio of the second generation liquid 15 that came from the second processor 4 and entered the fourth processor 8 to the total amount of the generation liquid generated in the second processor 4 was 1:12.

The volume flow ratio of the second branch generation liquid 18 that came from the third processor 6 and was recycled to the third processor 6 to the total amount of the generation liquid generated in the third processor 6 was 5:6. And the volume flow ratio of the second branch generation liquid 16 that was recycled to the fourth processor 8 to the total amount of the generation liquid generated in the fourth processor 8 was 5:6.

In this example, the volume flow ratio of the alkali added into the second processor 4 to the alkali added into the third processor 6 was 2:1.

The reaction temperature in the first processor 3 and that in the second processor 4 were respectively 80° C. The reaction temperature in the third processor 6 and that in the fourth processor 8 were respectively 75° C. The rotating speed of the rotating bed in the third processor 6 and that of the rotating bed in the fourth processor 8 were respectively 1,500 rpm. The residence time of the reaction stream in the third processor 6 and that of the reaction stream in the fourth processor 8 were respectively 10 s. The reaction results are as shown in Table 1.

Comparative Example 1

The steps of Example 1 were repeated under the same conditions except that the NaOH solution was altogether added in the fourth processor 8 instead of being added in different stages. The results are shown in Table 1.

Comparative Example 2

The steps of Example 2 were repeated under the same conditions except that the NaOH solution was altogether added in the fourth processor 8 instead of being added in different stages. The results are shown in Table 1.

Comparative Example 3

The steps of Example 1 were repeated under the same conditions except that the second generation liquid was cancelled as an absorption fluid of the fourth reaction. The results are shown in Table 1.

Comparative Example 4

The steps of Example 1 were repeated under the same conditions except that the NaOH solution was altogether added in the fourth processor 8 instead of being added in different stages and that the second generation liquid was cancelled as an absorption fluid of the fourth reaction. The results are shown in Table 1.

TABLE 1

Reaction results of the examples and comparative examples

| | Example 1 | Example 2 | Comparative Example 1 | Comparative Example 2 | Comparative Example 3 | Comparative Example 4 |
|---|---|---|---|---|---|---|
| Concentration of the product of NaHS | 40% | 41% | 39% | 40% | 39% | 37% |
| Content of $Na_2S$ | <3% | <4% | <4% | <4% | <4% | <4% |
| Content of $H_2S$ in the purified gas ($mg/Nm^3$) | 25 | 30 | 28 | 28 | 30 | 32 |
| Operating cycle of the apparatus | The operation stayed still stable after 600 h. | The operation stayed still stable after 600 h. | Blockage occurred after operation of 300 h and manual processing was required. | Blockage occurred after operation of 400 h and manual processing was required. | Blockage occurred after operation of 280 h and manual processing was required. | Blockage occurred after operation of 50 h and manual processing was required. |

The results in Table 1 indicate that although the methods and apparatuses of the comparative examples can obtain purified gas containing more or less the same content of $H_2S$ as the method and apparatus of the present disclosure can obtain, i.e., both can achieve good processing effects of $H_2S$, the method and apparatus of the present disclosure have much longer operating cycles.

Figure 4:
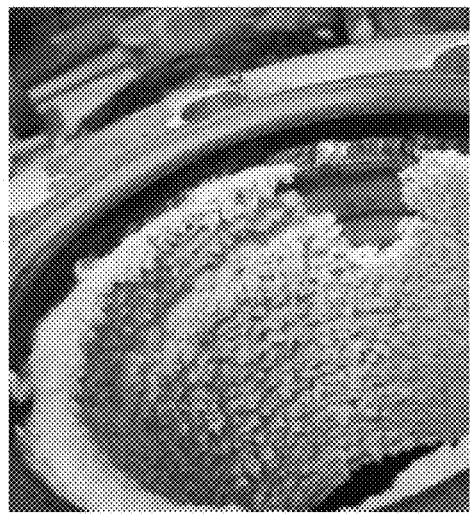
FIG. 4 shows an interior of a first reactor after 50 hours of operation in Comparative Example 4.
Figure 5:
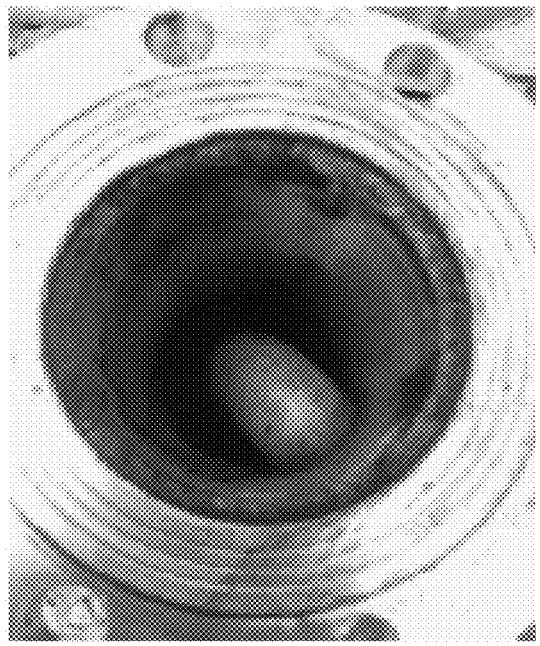
FIG. 5 shows an interior of a first Venturi reactor after 600 hours of operation in Example 2.

In order to further explain effects of the present disclosure, FIGS. 4 and 5 are provided respectively for showing an interior of the first reactor after 50 h of operation in Comparative Example 4 and that of the first reactor after 600 h of operation in Example 2. From FIGS. 4 and 5, it can be seen that, the first reactor of Example 2 which used the Venturi reactor as shown in FIG. 3 of the present disclosure had smooth and clean inner walls without formation of any crystal or dirt after 600 h of operation, ensuring a long-term stable operation of the apparatus. However, the first reactor of Comparative Example 4 which did not use any liquid storage tank indicated formation of crystals in the inner walls thereof after operation of merely 50 h.

As will be appreciated by one skilled in the art, the foregoing functions and/or process may be embodied as a system, method or computer program product. For example, the functions and/or process may be implemented as computer-executable program instructions recorded in a computer-readable storage device that, when retrieved and executed by a computer processor, controls the computing system to perform the functions and/or process of embodiments described herein. In one embodiment, the computer system can include one or more central processing units, computer memories (e.g., read-only memory, random access memory), and data storage devices (e.g., a hard disk drive). The computer-executable instructions can be encoded using any suitable computer programming language (e.g., C++, JAVA, etc.). Accordingly, aspects of the present invention may take the form of an entirely software embodiment (including firmware, resident software, micro-code, etc.) or an embodiment combining software and hardware aspects.

It should be noted that the above examples are only used to explain, rather than to limit the present disclosure in any manner. Although the present disclosure has been discussed with reference to preferable examples, it should be understood that the terms and expressions adopted are for describing and explaining instead of limiting the present disclosure. The present disclosure can be modified within the scope of the claims, and can be amended without departing from the scope or spirits of the present disclosure. Although the present disclosure is described with specific methods, materials, and examples, the scope of the present disclosure herein disclosed should not be limited by the particularly disclosed examples as described above, but can be extended to other methods and uses having the same functions.

The invention claimed is:

1. A system for processing an acid gas, comprising:
a first processor comprising a first gas inlet and a final liquid outlet;
a second processor comprising a first liquid inlet;
a third processor comprising a second liquid inlet;
a fourth processor comprising a final gas outlet;
a gas stream that enters the system through the first gas inlet in the first processor, passing through all of the four processors, and exits the system through the final gas outlet in the fourth processor;
an alkaline solution that enters the system through the first liquid inlet in the second processor and the second liquid inlet in the third processor simultaneously, passing through all of the four processors, and exits the system through the final liquid outlet in the first processor, and
wherein the gas stream entering the system comprises $H_2S$ and $CO_2$, and the alkaline solution exiting the system comprises $Na_2S$ and NaHS wherein at least one of the first processor, the second processor, the third processor, and the fourth processor is a Venturi reactor comprising:
an upper liquid storage tank that stores a first liquid, comprising a gas inlet and a liquid inlet;
a Venturi tube comprising a straight reaction tube, a throat pipe section, a discharge section, a contraction section disposed between the straight reaction tube and the throat pipe section, and an expansion section disposed between the throat pipe section and the discharge section; and
a lower gas-liquid separation tube comprising a second gas outlet and a second liquid outlet, wherein the straight reaction tube comprises a third liquid inlet upstream from the contraction section and a feed section extending into the upper liquid storage tank so that the upper liquid storage tank discharges the first liquid into the straight reaction tube by causing the aqueous solution to overflow the feed section, and
wherein the discharge section extends into the lower gas-liquid separation tube.

2. The system of claim 1, wherein the third liquid inlet in the Venturi reactor is disposed adjacent to a location where the upper liquid storage tank and the straight reaction tube connects.

3. The system of claim 1, wherein the feed section of the Venturi reactor has an upper edge that is sector tooth-shaped, square tooth-shaped, or triangular tooth-shaped.

4. The system of claim 1, wherein the Venturi reactor further comprises a liquid distributor disposed in a center of the straight reaction tube and arranged to inject liquid downwardly.

5. The system of claim 1, wherein the first processor, the second processor, the third processor, and the fourth processor are each independently selected from a group consisting of a bubble column reactor, a packed column reactor, an impinging stream reactor, a rotating bed reactor, and the Venturi reactor, with the proviso that at least one of the first processor, the second processor, the third processor, and the fourth processor is the Venturi reactor.

6. The system of claim 5, wherein the first processor and the second processor are respectively Venturi reactors, and the third processor and the fourth processor are respectively rotating bed reactors.

\* \* \* \* \*